Nov. 13, 1962 — H. H. HAAS — 3,063,434
INTERNAL COMBUSTION ENGINE
Filed Nov. 28, 1960 — 3 Sheets-Sheet 1
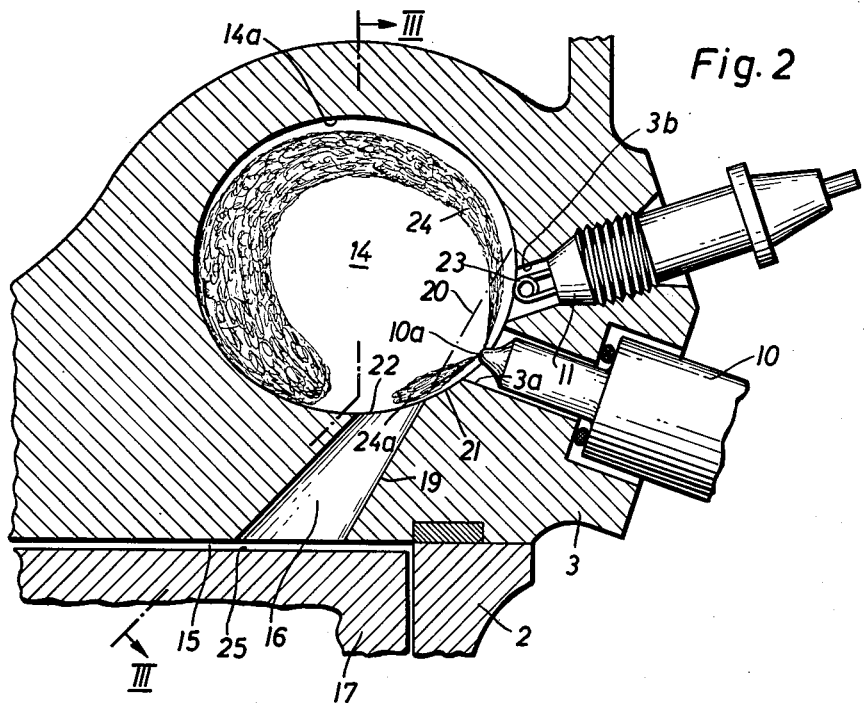
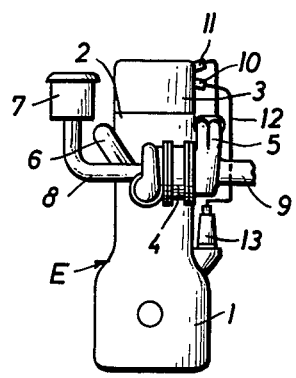
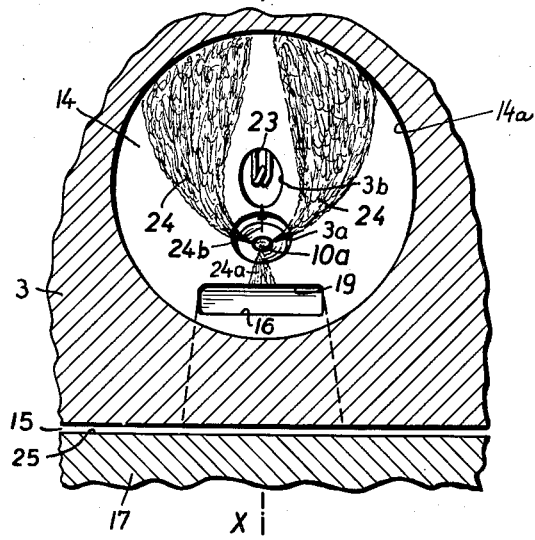
INVENTOR:
HERBERT H. HAAS
BY
his ATTORNEY Nov. 13, 1962    H. H. HAAS    3,063,434
INTERNAL COMBUSTION ENGINE
Filed Nov. 28, 1960    3 Sheets-Sheet 2

INVENTOR:
HERBERT H. HAAS
BY
*his* ATTORNEY

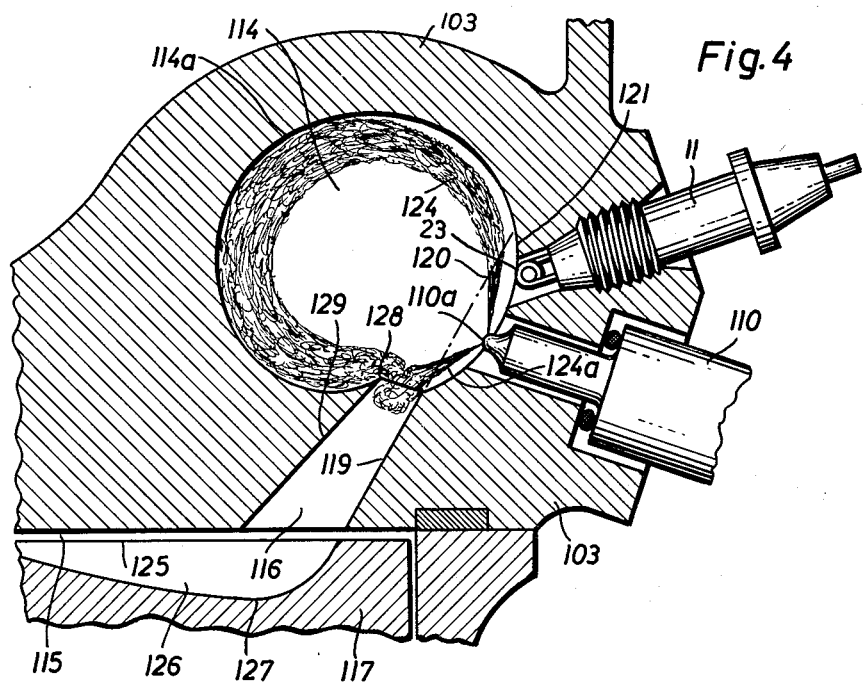
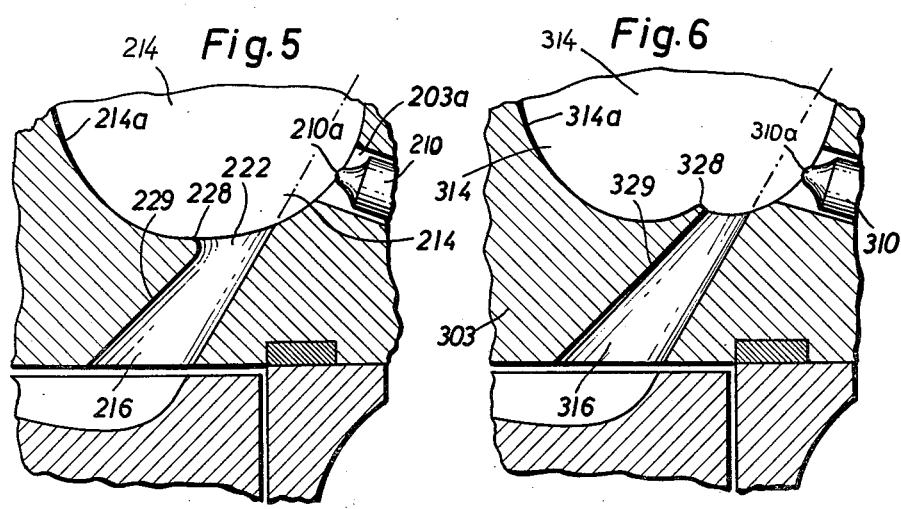

UNITED STATES PATENT OFFICE 3,063,434
Patented Nov. 13, 1962

3,063,434
INTERNAL COMBUSTION ENGINE
Herbert H. Haas, Irlenfelder Weg 50, Schloss Lerbach,
Bergisch Gladbach, Germany
Filed Nov. 28, 1960, Ser. No. 72,062
Claims priority, application Germany Nov. 27, 1959
10 Claims. (Cl. 123—32)

The present invention relates to internal combustion engines in general, and more particularly to improvements in compression ignition internal combustion engines of the type comprising a composite combustion chamber including a turbulence chamber as contrasted with engines having only so-called open combustion chambers.

In certain internal combustion engines, the open chamber consists of a combustion space formed by the top of the piston and the cylinder head, and the fuel is injected in the form of one or more tangential jets to form a thin film along the wall of the open chamber. The film is gradually separated from the wall of the open chamber by swirling air which is injected in the same direction as the fuel jet or jets so that the film is transformed into a mist or vapor which is intermixed with air and is thereupon combusted in the open chamber. A serious drawback of such internal combustion engines is that the piston is subjected to very high thermal stresses.

In order to reduce the thermal stresses upon the piston, it was already proposed to modify the open combustion chamber by the provision of an auxiliary chamber which is formed in the cylinder head and to connect this auxiliary chamber, usually called turbulence chamber, with the main combustion chamber by a restricted throat or passage which in tangential to the turbulence chamber. In such engines, it is normally preferred to prevent direct action of highly compressed dense air upon the injected fuel before the fuel can expand in the turbulence chamber. The action of highly compressed air is particularly felt at the point where the connecting passage communicates with the turbulence chamber. For example, the exit end of the injection nozzle may be located laterally with respect to the discharge end of the connecting passage or, alternately, the exit end of the injection nozzle may be located diametrically opposite the discharge end of the connecting passage for compressed air, i.e. the distance between the exit end of the nozzle and the discharge end of the connecting passage then attains a maximum possible magnitude.

An important object of the present invention is to provide a compression ignition internal combustion engine which also includes a turbulence chamber for each of its cylinders and which is constructed and assembled in such a way that it can operate with a high degree of efficiency at substantially reduced compression ratios.

Another object of the invention is to provide an internal combustion engine of the just outlined characteristics whose composite combustion chamber of chambers are of such design that they insure a satisfactory mixing of fuel and air under all operating conditions, and in which the fuel injecting nozzles are fully protected from direct action of highly compressed air.

A further object of my invention is to provide an internal combustion engine of the above described type whose combustion chambers combine the advantages of the so-called open chambers and of the so-called turbulence chambers.

An additional object of the instant invention is to provide an internal combustion engine of the above outlined characteristics which is formed with a series of composite combustion chambers insuring that the faces of the air-compressing pistons are fully protected from excessive thermal stresses.

With the above objects in view, the invention resides in the provision of an internal combustion engine which comprises at least one cylinder having an open end and comprising a cylinder head at the open end thereof a piston which is reciprocably received in the cylinder so as to define with the cylinder head a main combustion chamber, a turbulence chamber provided in the cylinder head and communicating with the main combustion chamber through a connecting passage which is arranged in the cylinder head in such a way that the stream of compressed air passing from the main combustion chamber into the turbulence chamber during each compression stroke of the piston is caused to circulate in a given direction in the turbulence chamber, and injector means for introducing into the turbulence chamber one or more jets of a fuel in such a way that the fuel is circulated in the same direction in which the compressed air discharged through the connecting passage circulates. An important feature of my invention resides in that the connecting passage is not entirely tangential to the turbulence chamber whereby a comparatively small compartment in the turbulence chamber is sheltered from direct impact of compressed air passing through the connecting passage, and in that the nozzle of the injecting means discharges fuel into this sheltered compartment of the tubulence chamber. The fuel forms a thin film along the wall of the turbulence chamber and this wall is maintained at a temperature substantially corresponding to the natural boiling point of the fuel.

The turbulence chamber may assume the form of a spherical cavity and the inclination of the connecting passage is preferably such that one of its wall portions which is turned toward the center of the turbulence chamber is disposed in a plane which, if extended into the turbulence chamber, would divide the latter's wall into two concave wall portions the smaller of which is formed with ducts for the injection nozzle and for the operative end of an igniter. The stream of highly compressed air enters the turbulence chamber along this imaginary plane and does not immediately penetrate into that compartment of the turbulence chamber which contains the injection nozzle. The nozzle is preferably closely adjacent to the discharge end of the connecting passage.

It can be said that the projection of the aforementioned imaginary plane onto a plane which is perpendicular thereto and which passes through the center of the turbulence chamber is a chord dividing the circular outline of the turbulence chamber into two unequal arcs, the smaller arc surrounding that compartment of the turbulence chamber which receives one or more jets of fuel from the nozzle. In other words, the stream of air discharged through the connecting passage during a compression stroke of the piston divides the turbulence chamber into a larger compartment and a smaller compartment, and the fuel is injected into the smaller compartment to circulate along the wall of the turbulence chamber into the larger compartment and toward the discharge end of the connecting passage, i.e. in the same direction as the compressed air.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 1 is a somewhat schematic side elevational view of a multi-cylinder internal combustion engine embodying my invention;

FIG. 2 is a greatly enlarged fragmentary section through a cylinder head forming part of the engine shown in FIG. 1, this cylinder head being formed with a turbulence chamber constructed in accordance with one embodiment of the invention;

FIG. 3 is a transverse section taken along the line III—III of FIG. 2, as seen in the direction of the arrows;

FIG. 4 is a section through a cylinder head which is formed with a modified turbulence chamber;

FIG. 5 is a fragmentary sectional view of a cylinder head defining a different turbulence chamber; and FIG. 6 is a similar fragmentary section through a cylinder head which is formed with a turbulence chamber somewhat similar to the turbulence chamber of FIG. 5.

Figure 2A:
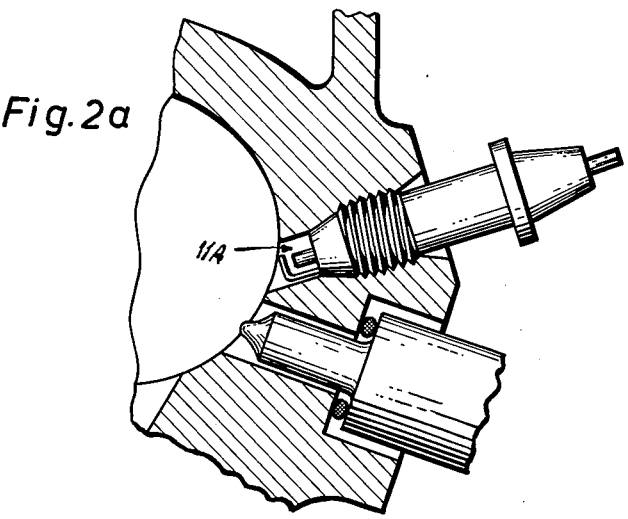
FIG. 2a is a fragmentary sectional view of a cylinder head, whose igniter consists of a spark plug.

Referring now in greater detail to the drawings, and first to FIG. 1, there is shown an internal combustion engine E which comprises a crankcase 1 supporting a series of in-line cylinders 2 (only one shown). Each cylinder 2 comprises a cylinder head 3 mounting the customary valve means (not shown) and formed with an internal turbulence chamber 14 shown in greater detail in FIGS. 2 and 3. The engine E is of the compression ignition type and, to that end, comprises a supercharger driven by an exhaust gas turbine 4 which communicates with the exhaust manifold through exhaust pipes 5 and which also communicates with the intake through a pipe 6. The turbine 4 draws combustion air through a filter 7 and a suction pipe 8. Exhaust gases are discharged from the turbine 4 through a pipe 9.

Each cylinder head 3 supports a fuel injector 10 and an igniter 11. The injectors 10 are connected to pressure conduits 12 leading to the pressure side of a fuel injection pump 13.

As stated above, the engine E is of the type comprising cylinder heads 3 formed with so-called turbulence chambers 14. As shown in FIGS. 2 and 3, the turbulence chamber 14 in the cylinder head 3 communicates with the main cylinder chamber 15 through a passage or throat 16. The main combustion chamber 15 is defined by the piston 17, by the open-ended cylinder 2, and by the latter's cylinder head 3. The inclination of the passage 16 is such that the air compressed by the piston 17 when the latter performs a compression stroke is caused to travel through the turbulence chamber 14 in a circular path (anticlockwise as viewed in FIG. 2). The nozzle 10a of the injector 10 introduces one or more jets 24 of fuel in such a way that the fuel is also caused to circulate in anticlockwise direction and forms a thin film along the wall of the turbulence chamber 14. This wall is heated to a temperature corresponding substantially to the natural boiling point of the injected fuel. As shown in FIGS. 2 and 3, the turbulence chamber 14 assumes the form of a spherical cavity, and the wall portion 19 of the connecting passage 16 is inclined with respect to the center of this chamber in such a way that its imaginary extension 20 divides the chamber 14 into two compartments, one bounded by a larger wall portion 14a and the other bounded by a smaller wall portion 21. FIG. 2 also shows that the nozzle 10a is received in a duct 3a which is formed in the cylinder head 3 so that the exit end of this nozzle projects slightly into that compartment which is bounded by the wall portion 21, and that this exit end is closely adjacent to the discharge end 22 of the passage 16. In other words, rather than extending tangentially to the turbulance chamber 14, the connecting passage 16 is inclined in such a way that the stream of compressed air does not immediately penetrate into a comparatively small compartment (between the imaginary plane 20 and the wall portion 21) of the turbulence chamber 14 and thus permits unobstructed introduction of fuel so that the fuel jet or jets 24 are actually brought into contact with compressed air only at the intersection of the imaginary plane 20 with the wall of the chamber 14, it being assumed that the stream of compressed air and the jets of fuel are caused to circulate or swirl in the same direction, i.e. anticlockwise as viewed in FIG. 2. It will be noted that the stream of air flowing from the passage 16 into the chamber 14 divides the latter into two unequal compartments and that the jets of fuel are injected into the smaller compartment.

Figure 2B:
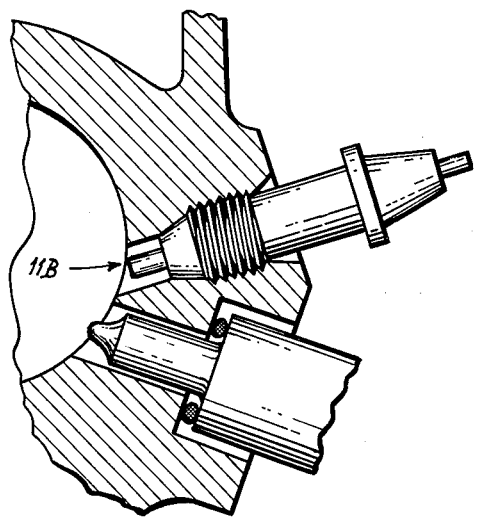
FIG. 2b is a similar fragmentary sectional view of a cylinder head whose igniter consists of a catalyst.

The cylinder head 3 is formed with a second duct 3b to receive the operative end 23 of an igniter 11 which is disposed at the downstream side of but in the same compartment as the nozzle 1a, i.e. the operative end 23 of the igniter is provided at the right-hand side of the imaginary plane 20, as viewed in FIG. 2. The plane 20 is located between a plane which passes through the center of the turbulence chamber 14 and a plane which is tangential to the outline of this chamber. As is shown in FIG. 3, the operative end 23 of the igniter 11 is preferably disposed substantially midway between the two diverging jets 24 of fuel discharged by the nozzle 10a. This insures that the operative end 23 is always contacted by a rich marginal mixture of finely dispersed fuel and compressed air. The operative end 23 of the igniter 11 is shown in the form of a glow plug though it is equally possible to utilize a spark plug 11A (FIG. 2a) or a catalyst 11B (FIG. 2b), e.g. a platinum sponge or the like. In the latter instance, the igniter preferably comprises means for heating the catalyst.

In the embodiment of FIGS. 2 and 3, the piston 15 is formed with a flat face 25. When the piston reaches the end of its forward or compression stroke, it reduces the volume of the main combustion chamber 15 to a minimum, i.e. its face 25 moves into very close proximity of the cylinder head 3. In other words, the compressed air is nearly completely expelled into the turbulence chamber 14 whenever the piston 17 performs a compression stroke.

FIG. 4 shows a slightly modified construction of the piston and of the cylinder head. As shown, the piston 117 again moves its face 125 into close proximity of the modified cylinder head 103, but the face 125 is formed with a recess 126 which communicates with the main combustion chamber 115 and also with the connecting passage 116. In other words, the arrangement of FIG. 4 combines the features of an open chamber and of a turbulence chamber. It will be noted that there is a smooth transition between the wall 127 of the recess 126 and the wall portion 119 of the connecting passage 116. Instead of permitting a nearly complete combustion of a fuel-air mixture in the turbulence chamber 14 (see FIGS. 2 and 3), the arrangement of FIG. 4 allows for partial combustion of the mixture in the turbulence chamber 114 and for partial combustion in the main combustion chamber 115 and in the recess 126. Depending on the ratio of the volume of the turbulence chamber 114 to the combined volume of the main combustion chamber 115 and recess 126, the major part of the fuel-air mixture will be combusted in the chamber 114 or in the chamber 115. If it is desired to insure that the major part of the fuel-air mixture is combusted in the main chamber 115, it is preferred to provide in the left-hand compartment of the turbulence chamber 114 a sharp edge 128 which is formed between the left hand wall 129 of the connecting passage 116 and the wall portion 114a. The fuel jet or jets 124 injected by the nozzle 110a of the injector 110 form a thin film which travels anticlockwise along the wall portions 121, 114a toward and is broken or deflected along the edge 128. As in the embodiment of FIGS. 2 and 3, the imaginary extension 120 of the right-hand wall portion 119 in the connecting passage 116 divides the turbulence chamber 114 into two unequal compartments which are bounded by the wall portions 114a and 121. The fuel passing beyond the edge 128 is blown back through the passage 116 and into the main combustion chamber 115 owing to the rise in pressures developing on combustion of the fuel-air mixture in the turbulence chamber 114, and is thereupon completely combusted in the main chamber. It will be noted that the edge 128 is provided on a protuberance of the cylinder head 103 so that it projects into the turbulence chamber 114, i.e. that the section through the turbulence chamber 114 in a plane passing through the passage 116 is not of truly circular contour.

In certain instances the sharp edge 128 of the cylinder head 103 shown in FIG. 4 is preferably replaced by a smooth rounded edge 228 of the type shown in FIG. 5. This edge 228 is provided along the junction of the left-hand wall portion 229 in the connecting passage 216 with the wall portion 214a in the turbulence chamber 214. The section through the wall of this chamber 214 is of circular contour, i.e. the edge 228 is actually provided in the discharge end 222 of the connecting passage 216.

FIG. 6 illustrates a further modification which combines the features of the constructions shown in FIGS. 4 and 5. The connecting passage 316 is bounded by a left-hand wall portion 329 which defines with the wall portion 314a of the turbulence chamber 314 a rounded edge 328 provided on a projection of the cylinder head 303 which extends into the turbulence chamber. The edge 328 divides the wall portion 314a into two concave sections.

A very important advantage of my invention is that the fuel injected through the nozzle 10a, 110a, 210a or 310a into the respective turbulence chamber is free to expand and to form a thin film along the wall of the turbulence chamber before it comes into direct contact with the strong blast or stream of compressed air developing in and passing through the discharge end of the connecting passage. Thus, the compressed air stream cannot prevent the jet or jets of injected fuel from reaching the wall of the turbulence chamber and from forming a thin layer or film along this wall. In addition, and as best shown in FIG. 3, the injection nozzle 10a is normally located in the central symmetry plane X—X of the turbulence chamber 14 so that the fuel film may travel along the entire periphery of this chamber not only in the plane of FIG. 2 but also in directions at right angles to this plane. In other words, the fuel may form a film which is capable of expanding along the wall of the turbulence chamber 14 in two directions which are substantially perpendicular to each other, i.e. in an equatorial direction (plane of FIG. 2) and in a meridian direction (plane of FIG. 3). This insures that the fuel film covers an exceptionally large area and that each of its zones comes into satisfactory contact with compressed air. It will be noted that the symmetry plane X—X is also the symmetry plane of the connecting passage 16.

As mentioned hereinabove, the injector 10, 110, 210 or 310 may introduce fuel in the form of one or more jets. For example, FIG. 3 shows that the nozzle 10a is provided with two ports so that it may form two jets 24, one at each side of the symmetry plane X—X. Each jet 24 assumes the shape of a closed fan or curtain with short penetration.

In FIG. 4, the nozzle 110a is assumed to inject fuel in the form of four jets 124 (only one shown). Such arrangement insures a better distribution of fuel along the wall of the turbulence chamber 114.

It is equally possible to utilize nozzles which inject an odd number of fuel sprays or jets. For example, and referring to FIG. 3, the nozzle 10a may be formed with a third port which then injects fuel in the direction indicated by the arrow 24b, i.e. substantially in the symmetry plane X—X. An important advantage of nozzles with two, three or more ports is that the fuel is distributed along a substantial area of the wall in the turbulence chamber right from the start, i.e. immediately after its injection into the turbulence chamber.

When the jets of injected fuel expand and form a thin film along the wall of the turbulence chamber, a finely atomized mixture of fuel and air develops in the marginal zone between two adjacent fuel jets. In FIG. 3, this marginal zone is located substantially in the symmetry plane X—X, i.e. midway between the jets 24. In accordance with a feature of my invention, the igniter 11 may be positioned in such a way that its operative end 23 is located in the marginal zone (i.e. in the common symmetry plane X—X of the nozzle 10a, of the turbulence chamber 14 and of the connecting passage 16), so that the combustion of the fuel-air mixture is started in the marginal zone. Such arrangement insures better starting of a cold engine and a shortening of the ignition lag, especially under partial load, and it also insures that the engine may be operated at a substantially reduced compression ratio. Consequently, the improved engine runs smoothly, which cannot be stated of all presently known engines with turbulence chambers of conventional design.

When the engine operates at a reduced compression ratio, the igniter system operates continuously, at least when the engine is under partial load. As clearly shown in FIGS. 2–6, the operative end of the igniter is located at the downstream side of the injection nozzles, i.e. in the path of fuel jets which are discharged by the nozzle. As fully explained hereinabove, the igniter system is provided in that compartment of the turbulence chamber which also receives the injection nozzle and is preferably located in the marginal zone between a pair of adjacent fuel jets where the fuel and compressed air form a finely atomized rich mixture regardless of whether the engine is idling or is operated at maximum load.

An additional very important advantage of the operation at a reduced compression ratio is that the engine may be equipped with a supercharger, particularly with a supercharger embodying an exhaust gas turbine 4, without the danger of attaining excessive peak pressures during operation under full load. For example, the supercharger including the turbine 4 may be adjusted in such a way that the fuel-air mixture will not be ignited by itself when the engine is idling and that the ignition is fully automatic when the engine is operated under maximum load, i.e. when the supercharger is put to full use.

Referring back to FIG. 2, it will be noted that the longitudinal axis of the nozzle 10a is substantially perpendicular to the direction of the air stream emanating from the connecting passage 16. This protects the exit end or cap of the nozzle 10a. This end may be located in the smaller compartment which is bounded by the imaginary plane 20 and by the wall portion 21 or, and as shown in FIG. 5, the end of the nozzle 210a may be located entirely within the duct 203a so that it is protected from direct impact of the compressed air stream emanating from the connecting passage 216 as well as from the stream of compressed air which circulates along the wall of the turbulence chamber 214. In FIG. 2, the end of the nozzle 10a projects slightly from the duct 3a and is thus exposed to the action of air circulating along the wall portion 21. It will be noted that the axis of the injection nozzle 10a need not be exactly perpendicular to the plane 20.

FIG. 3 shows that the discharge end 22 of the connecting passage 16 is of elongated cross-sectional contour so as to insure a highly satisfactory intermixing of air with the film of fuel along the wall of the turbulence chamber 14. Thus, the stream of compressed air discharged through the end 22 of the passage 16 forms a wide strip or band which comes into contact with an equally wide zone of the fuel. The longitudinal direction of the discharge end 22 is perpendicular to the symmetry plane X—X.

In some instances, it is advisable to utilize injection nozzles which can inject a small quantity of fuel in a direction toward the connecting passage. As shown in FIGS. 2–3 and 4, the nozzles 10a, 110a respectively discharge small fuel jets 24a, 124a in directions toward the discharge ends 22, 122 of the respective connecting passages 16, 116. The jets 24a, 124a respectively constitute but small fractions of the total fuel injected by the nozzles 10a, 110a per unit of time. The jets 24a, 124a insure that the engine may be started in cold weather. Of course, it is equally possible to utilize nozzles which simultaneously inject two or more different fuels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In an internal combustion engine, in combination, a cylinder having an end and comprising a cylinder head adjacent to said end thereof; an air-compressing piston reciprocably received in said cylinder and defining with said cylinder head a main combustion chamber in said cylinder, said cylinder head formed with a turbulence chamber and with a passage connecting said main combustion chamber with said turbulence chamber, said passage shaped and arranged in such a way that the stream of air entering said turbulence chamber through said passage during a compression stroke of said piston divides said turbulence chamber into a larger compartment and a smaller compartment, said compartments disposed at the opposite sides of said stream so that the air circulates along the wall of said larger compartment and toward said passage; and means for injecting at least one jet of fuel into said smaller compartment so that the injected fuel reaches and forms a film along the wall of said turbulence chamber before reaching said stream and that the thus formed fuel film circulates in the same direction as the air.

2. A combination as set forth in claim 1, further comprising igniter means provided in said smaller compartment at the downstream side of said injecting means.

3. A combination as set forth in claim 2, wherein said injecting means comprises nozzle means for injecting at least two spaced jets of fuel into said smaller compartment so that the injected fuel forms a film along the wall of said turbulence chamber and circulates in the same direction as the air, said igniter means located between said jets of fuel.

4. A combination as set forth in claim 1, wherein said injecting means comprises nozzle means for injecting at least two fan-shaped jets of fuel with short penetration into said smaller compartment.

5. A combination as set forth in claim 1, wherein said passage and said turbulence chamber have a common plane of symmetry and said injecting means comprises nozzle means for injecting an odd number of fuel jets into said smaller compartment so that one of said fuel jets is injected substantially in said symmetry plane.

6. A combination as set forth in claim 1, wherein said injecting means comprises nozzle means for injecting said one jet of fuel and for injecting into said smaller compartment at least one second jet of fuel in a direction toward said passage.

7. A combination as set forth in claim 1, wherein said passage has an elongated discharge end so that the air entering said turbulence chambers assumes the form of a wide band.

8. A combination as set forth in claim 1, wherein the wall of said larger compartment and the wall of said passage define between themselves an edge projecting into said turbulence chamber.

9. A combination as set forth in claim 1, further comprising exhaust turbine driven supercharger means for supplying compressed air to said main combustion chamber.

10. In an internal combustion engine, in combination, a cylinder having an open end and comprising a cylinder head adjacent to said open end thereof; an air-compressing piston reciprocably received in said cylinder and defining with said cylinder head a main combustion chamber in the cylinder, said cylinder head formed with a turbulence chamber of substantially circular outline and with a passage connecting said main combustion chamber with said turbulence chamber, said passage disposed between a plane passing through the center of said turbulence chamber and a plane substantially tangential to the outline of said turbulence chamber so that the stream of compressed air discharged from said passage during a compression stroke of said piston divides the turbulence chamber into a smaller compartment and a larger compartment and thereupon circulates along the wall of said larger compartment and toward said passage; and means for injecting at least one jet of fuel into said smaller compartment so that the injected fuel reaches and forms a film along the wall of said turbulence chamber before reaching said stream and that the thus formed fuel film circulates in the same direction as the air stream.

References Cited in the file of this patent

UNITED STATES PATENTS

| | | |
|---|---|---|
| 2,169,381 | Chapman | Aug. 15, 1939 |
| 2,204,068 | Chapman | June 11, 1940 |
| 2,921,566 | Meurer | Jan. 19, 1960 |

FOREIGN PATENTS

| | | |
|---|---|---|
| 72,509 | Netherlands | June 15, 1953 |
| 579,214 | France | July 26, 1924 |
| 608,729 | Great Britain | Sept. 20, 1948 |